May 31, 1960 A. B. NEWTON ET AL 2,938,358
COMBUSTION-ENGINE-DRIVEN COMPRESSOR APPARATUS
Filed Dec. 9, 1955 2 Sheets-Sheet 1
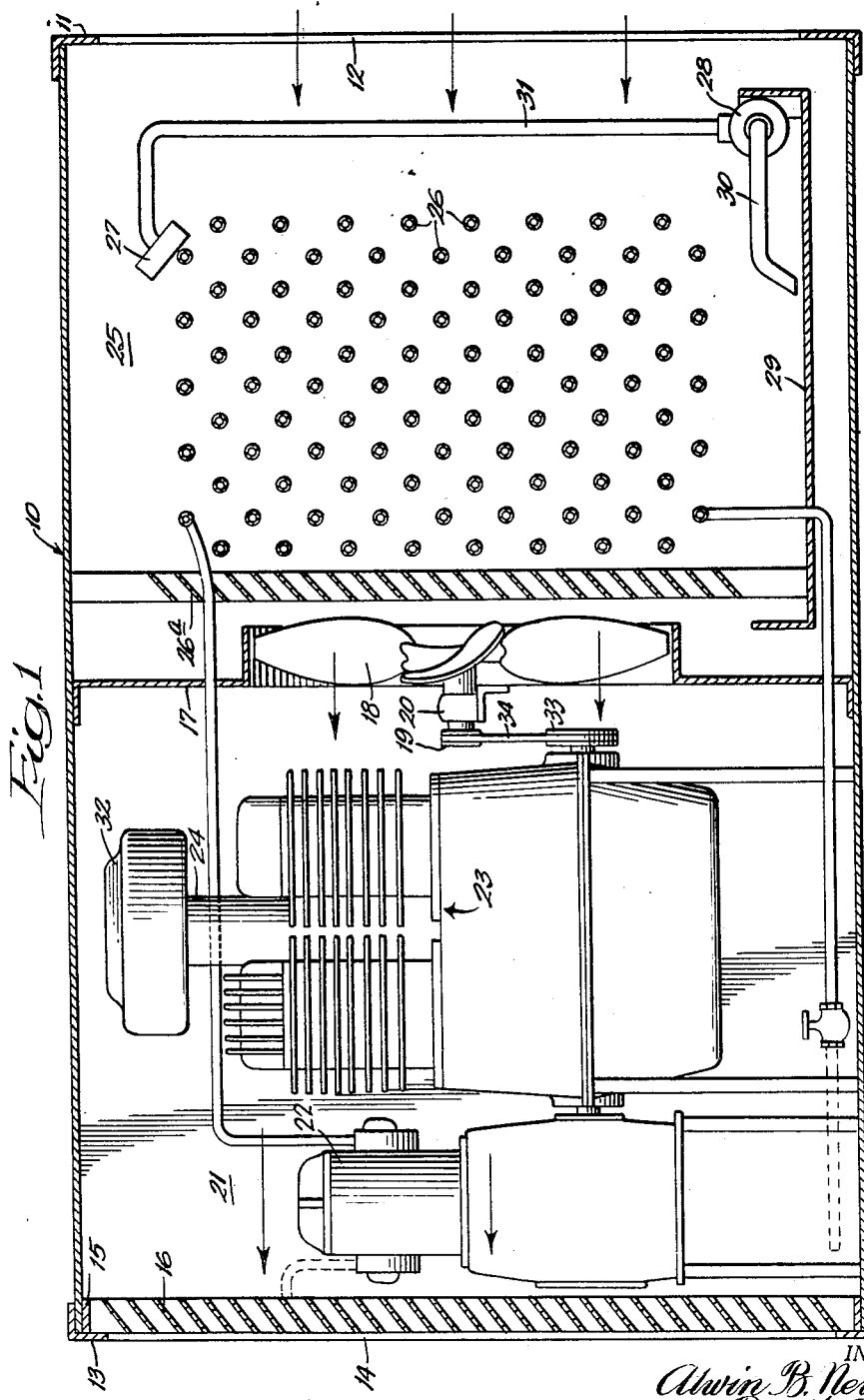
INVENTORS:
Alwin B. Newton and
BY Ray W. Quatley,
Dawson, Tilton & Graham,
ATTORNEYS.

May 31, 1960  A. B. NEWTON ET AL  2,938,358
COMBUSTION-ENGINE-DRIVEN COMPRESSOR APPARATUS
Filed Dec. 9, 1955  2 Sheets-Sheet 2
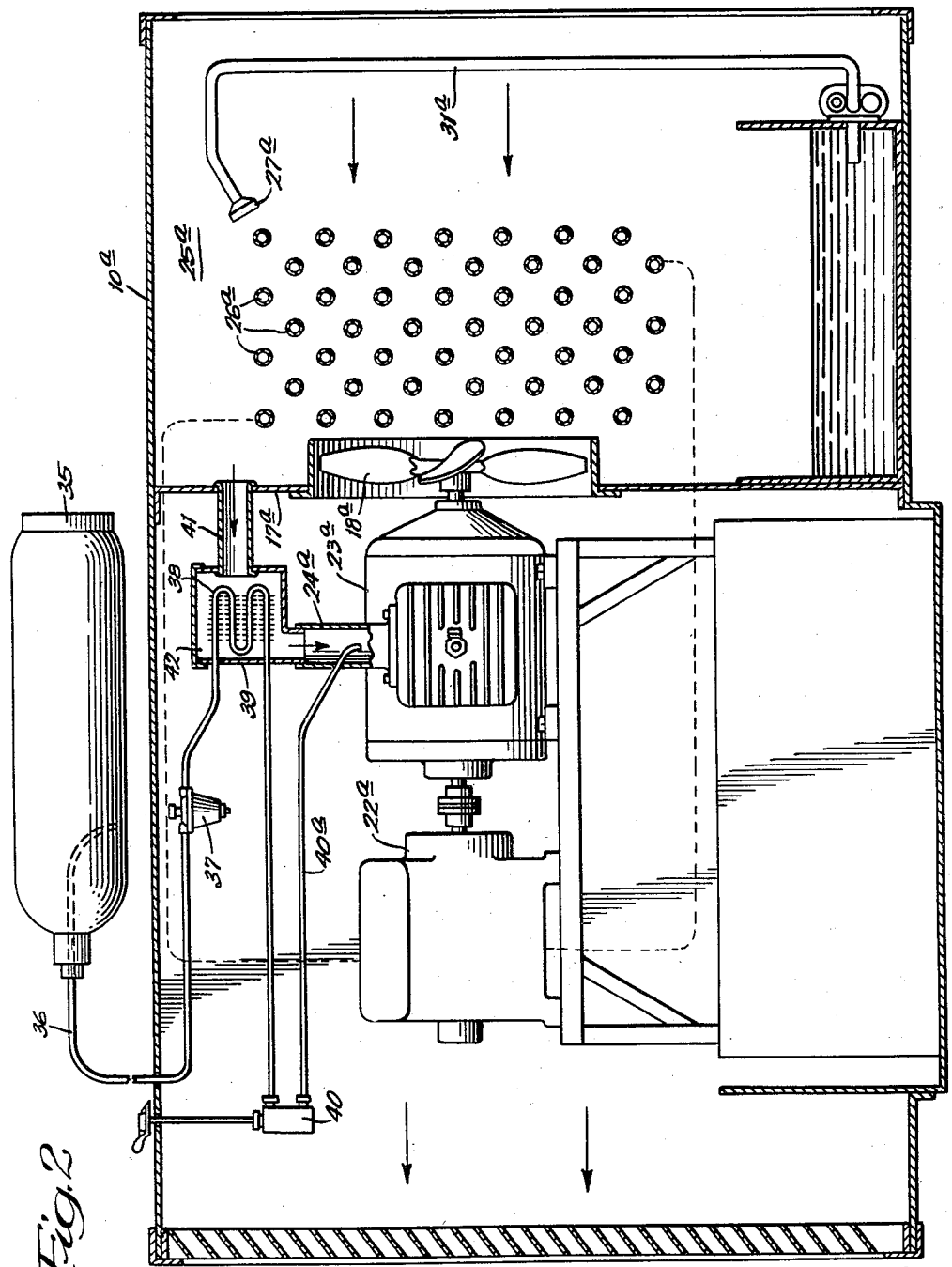
INVENTORS:
Alwin B. Newton and
BY Ray W. Qualley,
Dawson, Tilton & Graham,
ATTORNEYS.

United States Patent Office 2,938,358
Patented May 31, 1960

2,938,358

COMBUSTION-ENGINE-DRIVEN COMPRESSOR APPARATUS

Alwin B. Newton and Ray W. Qualley, Wichita, Kans., assignors to The Coleman Company, Inc., Wichita, Kans., a corporation of Kansas Filed Dec. 9, 1955, Ser. No. 552,191

4 Claims. (Cl. 62—7)

This invention relates to a combustion-engine-driven compressor apparatus, and more particularly to a refrigeration compressor driven by an internal combustion engine and employing refrigerant condensing coils and cooling means therefor. The present invention is particularly useful in connection with the cooling of air passed over the engine and compressor and into the engine intake.

In the operation of a combustion-engine-driven compressor, wherein refrigerant fluid is compressed and condensed, it is of great importance in maintaining and increasing the efficiency of the engine that air be cooled and delivered over the engine and compressor and fed to the intake of the engine. Since, in most cases, the available air is already at a very high temperature, the problem of bringing about such cooling is not an easy problem, particularly in a system where the air would normally be heated if employed for lowering the temperature of the compressed fluid within refrigerant coils. Further, in engine-driven refrigerant systems in which liquefied petroleum fuels have been employed, the liquefied petroleum is stored in an outdoor tank and is evaporated by obtaining heat from the surroundings as fuel is used from the tank. Any cooling effect which might be otherwise accomplished by the expansion of the liquefied petroleum gas is wasted on the atmosphere and is not utilized in any manner for increasing the efficiency of the engine. If the air fed into the evaporative condenser chamber could be utilized in the extraction of heat from the condenser coils, and thereafter utilized as a cooling medium for cooling the engine and compressor, and for supplying cool air to the intake of the engine, a very substantial increase in the volumetric efficiency of the engine could be brought about. The lower the temperature of the fuel-air mixture, the more fuel can be introduced into the cylinder and the engine horsepower thus increased. Further, if it were possible to utilize the liquefied petroleum gas as a means for further cooling the air supplied to the intake of the motor, still greater power output could be brought about.

An object of the present invention is to provide a process or combination wherein the above described objectives can be reached and a substantial increase in engine power output brought about. A further object is to provide in a refrigeration system employing an internal combustion engine, compressor and water-cooled refrigerant condensing coils and circulating means whereby cooled and moistened air from the coil chamber may be passed over the engine or compressor, or both, and may be also passed to the carburetor or fuel intake of the engine. A still further object is to provide in such combination, means whereby cooled and moistened air is passed over the compressor and engine while at the same time a portion of such air is by-passed so as to enter the carburetor of the engine. Yet another object is to utilize an expansion of liquefied petroleum as a further means for cooling the air fed to the intake of the motor so as to still further increase the power input of the motor. Still another object is to provide an improved refrigerant cooling system and internal combustion engine mechanism employing or operating a compressor whereby greater power output in the operation of the engine is brought about. Other specific objects and advantages will appear as the specification proceeds.

The invention is shown, in illustrative embodiments, by the accompanying drawings, in which—

Figure 1 is a vertical sectional view of apparatus embodying our invention; and Fig. 2, a view similar to Fig. 1 but showing a modified form of the invention.

In the illustration given in Fig. 1, 10 designates a casing having an end wall 11, provided with an air-intake aperture 12. The opposite end of the casing comprises an end wall 13 having an outlet aperture or opening 14 therein, and supported adjacent the wall 13 is a perimetric frame 15 supporting a louver 16.

The casing 10 is provided centrally with a vertical partition 17 having a central opening in which is housed a fan 18. The fan 18 is equipped with a shaft provided with a pulley 19, the shaft being journaled within a bearing 20.

In the compartment 21 provided at the left of the partition 17 is mounted a compressor 22 driven by an internal combustion motor 23 equipped with the usual carburetor or air-fuel intake, indicated generally by the numeral 24. Since such structures are well known, a detailed description herein is believed unnecessary.

In the chamber 25, on the right hand side of the partition 17, we provide a series of refrigerant condensing coils 26, and from the coils is provided nozzle means 27 for spraying water over the coils. Any suitable number of nozzles or spray devices may be employed, and any means for directing the water over the coils may be used. In the specific illustration given, we provide a motor-driven pump 28 for recycling water from a sump or reservoir 29, the water being drawn into the pump through inlet pipe 30 and discharged upwardly through the pipe 31. Eliminator plates 26a may be installed between the coil 26 and fan 18 to catch droplets of moisture and direct them into the reservoir 29. Air passing through the central opening of the partition 17 under the action of fan 18 is delivered over the engine 23 to cool the cylinder walls and also over the compressor 22. A portion of the cooled and moistened air passes through the air cleaner 32 and into the carburetor duct or fuel-air mixer 24 leading to the motor.

The fan 18 may be driven by any suitable means. We prefer to provide an extension of the engine shaft with a pulley 33 and to connect pulley 33 with the fan pulley 19 by means of the belt 34.

In the operation of the apparatus shown in Fig. 1, the engine 23 is set into operation and compressor 22 compresses refrigerant gas and the same flows by connecting pipes as shown to the refrigerant condensing coils 26. Water is sprayed over the coils to cool them and the cooled and moistened air is drawn by the fan 18 through the central opening in partition wall 17 and thence over the motor 23 and compressor 22, and thus outwardly through the louver opening 14, a portion of the air entering the motor intake 24. In this operation, the air entering the carburetor or fuel intake is cooled to the wet bulb temperature of the air cooling the condenser in chamber 25, while at the same time the air is cleaned by the water wash and is moistened by the evaporative condenser. In the climates in which the cooling mechanism is ordinarily employed, untreated air for condensation would be 40 to 80 degrees higher in temperature. By operation with the cooler, moistened air, it is found that the engine volumetric efficiency is increased by 4 to 8 percent, while at the same time particles which would injure the engine are removed by the washing operation.

In the modification shown in Fig. 2, there is supported above the casing 10a a container 35 for liquefied petroleum, and a draw-off tube 36 extends from a point near the bottom of the container 35 and through the housing 10a and a pressure regulator 37, and thence the expanding gas passes through the heat-exchange coils 38 within the casing 39 and thence through a control valve 40 downwardly and into the fuel mixer intake 24a of the motor 23a which drives the compressor 22a. In this structure, air drawn from the inner side of the evaporative condenser coils 26a is passed through the by-pass tube 41 into the chamber 42 provided by the casing 39 and thence into the fuel mixer tube 24a.

The remaining structure is very similar to that described in connection with Fig. 1, except that the fan 18a is directly fixed to the end of the engine shaft and is driven thereby. Water or other liquid is drawn through a pipe 31a and discharged through a nozzle 27a or through a series of nozzles, onto the coils 26a.

In the operation of the structure shown in Fig. 2, the liquefied petroleum fuel is utilized in a manner to increase the engine horsepower. The LP fuel passes through the pressure regulator, and thence in expanded form through the heat exchanger 38 to cool the incoming air entering chamber 42 through the by-pass 41. The evaporated gas then passes through the valve 40 and thence through the tube 40a into the mixer tube 24a. It will be understood that the evaporated gas in the tube 38 may be employed for cooling air introduced directly from outside the casing A, but we prefer, however, to introduce the air directly from the chamber 25a which has already been cooled and which carries moisture into the chamber 42 for further cooling through contact with the cooling coil 38. By this heat exchange, the engine mixture is cooled an additional 25% to 30%, thus increasing the engine capacity by as much as 3–5%. In contrast with the conventional LP systems, which remove vapor from the top of the storage tanks and the heat of evaporation is supplied from the surrounding atmosphere, producing no useful effect, the expansion of the LP gas is utilized for further cooling the already-cooled air passing through the by-pass 41 into chamber 42. It will be understood that the by-pass 41 may be omitted and the air passing through the central opening in the partition 17a may be directed into the cooling chamber 42 for further cooling before admixture with the gas in the duct 24a.

While the foregoing structure is shown as an air conditioning unit equipped with a wet bulb type condenser, it will be understood that the utilization of the LP system as described above for pre-cooling combustion air can be employed with other forms of apparatus.

By way of illustration, the process may be described in connection with a typical day which exists in many Western and Southern States in which the air enters the chamber 25 at a dry bulb temperature of 115° F. The air having a wet bulb temperature of 67° F. and after being utilized in the operation for carrying water spray over the coils to condense the heated gases therein, leaves the center opening of the partition 17 at a temperature of 91° F. (dry bulb). Thus the air for cooling the engine is 24° cooler than when it entered. At the rate of 8° for 1% of increased power, the lowering of the temperature of the intake air by 24° results in an increase of 3% greater power. As above described, the increase in horsepower is further augmented by the increased cooling taking place through the expansion of the LP gas as above described.

It is surprising to find that by passing the air through a circuit in which the air stream is first heated by contact with the condenser coils 26 (by the wet bulb process), the added heat to the air body by the west bulb process reduces the dry bulb temperature of the air so that such air can now be utilized for cooling; in other words, the air entering a chamber where it is to be heated by contact with coils, comes out of the chamber cooler than when it entered and the increased humidity of the air combines with the lowering of temperature thereof for improving combustion. In other words, heat is added to the air stream as it passes through the condenser, but because of the wet bulb process, the exit air actually has a lower dry bulb temperature than does the entering air.

While, in the foregoing specification, we have set forth specific structures and steps in considerable detail for the purpose of illustrating the invention, it will be understood that such details may be varied widely by those skilled in the art without departing from the spirit of our invention.

We claim:

1. In combination with an internal combustion engine having a carburetor, a compressor driven by said engine, a casing enclosing said engine and compressor and providing an intake opening at one end and an outlet opening at the other, a partition wall within said casing providing on one side a compartment containing said engine and compressor and on the other side a coil compartment, said partition having a central opening, a fan mounted in said opening, condensing coils mounted in said coil compartment and receiving compressed refrigerant gas from said compressor, means for directing water over said coils, said engine driving said fan to draw air over said coils to reduce the temperature of said air and deliver the same over said engine, and a by-pass duct extending through said partition and leading a portion of said cooled air from said coils to said carburetor.

2. In combination with an internal combustion engine having a fuel and air intake, condensing coils adapted to receive compressed refrigerant gas from compressor means associated with said engine, means for spraying water upon said coils whereby evaporation of liquid portions thereof occurs, means for directing air flow over said coils and portions of said air to said engine intake, a reservoir for liquefied petroleum, a conduit leading from said reservoir to said engine intake, and valve means for expanding said petroleum into a heat-exchanger exposed to said engine intake air within which said petroleum is evaporated by cooling the engine intake air.

3. In combination with an internal combustion engine having a fuel and air intake and operatively coupled with compressor means, said engine and compressor means being mounted in one compartment of an air flow passage, refrigerant condensing coils mounted in a second compartment of said passage upstream of said first-mentioned compartment, said coils receiving compressed refrigerant from said compressor means and having means associated therewith for directing a liquid spray thereon, a reservoir for liquefied petroleum at a pressure corresponding to an ambient temperature, a conduit leading from said reservoir to said intake, said conduit providing an evaporator chamber therein, valve means for reducing the pressure and thereby the temperature of said petroleum before it enters said evaporator chamber, means for bringing intake air from said second compartment into heat-exchange relationship with said evaporator chamber to evaporate the low pressure petroleum therein, and conduit means for directing said washed and cooled intake air into said engine intake in admixed relationship with the evaporated gas.

4. Combustion-engine-driven compressor apparatus, comprising an air flow passage having an inlet at one end and an outlet at the other, means for moving air through said passage, a compressor in said passage adjacent said outlet, an internal combustion engine in said passage and adjacent said compressor, means operatively connecting said engine and compressor, said engine being equipped with a fuel and air intake, condensing coils in said passage adjacent said engine and coupled to said compressor to receive compressed refrigerant gas therefrom, means in said passage for spraying liquid on said coils to wet the same, whereby evaporation of liquid portions thereof occurs to lower the temperature of said air prior to its entry into said intake, an apertured partition interposed in said passage between said coil and said engine, said air moving means comprising a fan mounted in an aperture in said partition, a second aperture in said partition leading reduced temperature air from about said coils into a conduit coupled to said intake, and a reservoir for liquefied petroleum associated with said passage communicating with a second conduit coupled to said intake, a portion of the second conduit being disposed within the first-mentioned conduit in heat-exchange relation with the air passing through said first-mentioned conduit.

References Cited in the file of this patent

UNITED STATES PATENTS

| | | |
|---|---|---|
| 1,615,620 | Freeman | Jan. 25, 1927 |
| 2,187,398 | Goggins | Jan. 16, 1940 |
| 2,213,733 | Hicke | Sept. 3, 1940 |
| 2,323,511 | Baker | July 6, 1943 |
| 2,359,219 | Jones | Sept. 26, 1944 |
| 2,820,351 | Dolza et al. | Jan. 21, 1958 |